W. H. COXWELL.
ANIMAL TRAP.
APPLICATION FILED DEC. 3, 1910.
1,003,091.
Patented Sept. 12, 1911.
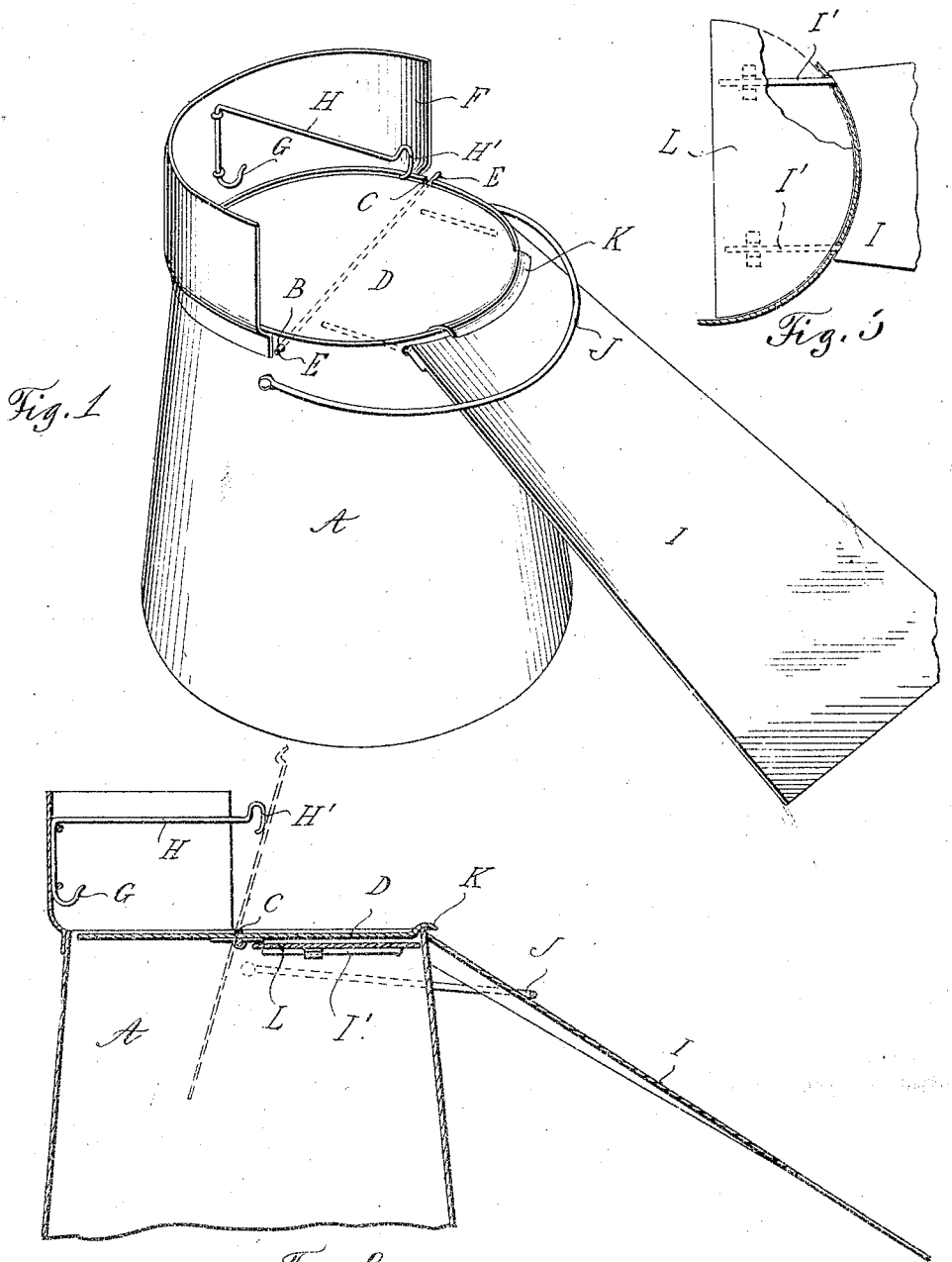
WITNESSES.
INVENTOR
William H. Coxwell
BY
Attorneys

UNITED STATES PATENT OFFICE.

WILLIAM H. COXWELL, OF WOODSTOCK, ILLINOIS.

ANIMAL-TRAP.

1,003,091.  Specification of Letters Patent.  Patented Sept. 12, 1911.

Application filed December 3, 1910. Serial No. 595,443.

*To all whom it may concern:*

Be it known that I, WILLIAM H. COX-WELL, a citizen of the United States, residing at Woodstock, in the county of Mc-Henry and State of Illinois, have invented certain new and useful Improvements in Animal-Traps, of which the following is a specification.

This invention relates to certain novel improvements in traps and pertains particularly to devices designed to entrap mice, rats, gophers, rabbits, minks, squirrels, or other animals of this nature.

The object of this invention is to provide a simple and efficient device whereby a number of animals may be entrapped by means which prevent the bait from being devoured, obviating the necessity of rebaiting after performing its desired function.
An important feature of the device is that it needs no resetting, but automatically returns to operative position after accomplishing the desired result.

For a full comprehension of the advantages and construction of this invention, reference is to be had to the accompanying drawings, in which:

Figure 1 is a perspective view of the invention, Fig. 2 is a sectional view of the device; and Fig. 3 is a fragmentary sectional view illustrating the mounting of the stop plate.

Referring to the drawings, A represents a cylindrical shaped receptacle, having near its top oppositely disposed bearings B and C, consisting in this instance of holes or openings, whereby the disk or plate D is pivoted by means of the rod E. The opposite end portions of the rod E, forming the pivots of said disk or plate are positioned in the bearings B and C, the latter being slightly to one side of the center of the receptacle so that in the operation of the device, one side of said disk will gravitate to its initial position automatically. The said disk is so constructed that when properly positioned, one side thereof, preferably formed with a flange K, rests upon the top of the receptacle A, while its opposite side is free to move downwardly inside of said receptacle. Opposite that part of the disk or plate which rests upon the top of the receptacle is a guard F, semicircular in shape, adapted to surround that part of the disk which is free to move downwardly, and riveted or fastened to the top of the receptacle in any well known manner, said guard serving to prevent the animal from jumping or climbing over that side of the receptacle and also adapted to hold the bait hook G centrally located thereon. Preferably made integral with the hook G is a rod or arm H which extends horizontally over and in the path of movement of the disk, far enough to form an abutment for the said disk when the same swings upwardly as the weight of the animal causes it to tilt, thereby limiting its movement. On the end of the rod or arm H is formed a spring extension member H′ which is adapted to accelerate the gravitating movement of the disk or plate as the animal falls into the receptacle causing the disk to resume its original position.

The parts G, H and H′ may be considered a single length of wire having a hook G at one end thereof secured to the intermediate portion of the guard, and having its upward projecting end formed into a spring member.

External to and on the side opposite the bait is located an inclined plate I forming an approach or easy means of access to the top of the receptacle. Preferably a bail J is provided so as to permit of easy handling of the trap.

In the actual use of this device, it will readily be seen that when the animal, attracted by the bait, crosses the disk or plate, the free side of same tilts downwardly, instantly throwing it into the receptacle, whereupon the plate prevented from further circular movement by the arm H, and assisted by the spring extension H′, resumes its original position, and is in readiness for the same operation when another animal is induced thereupon. In this manner the bait on the hook G is not disturbed, and hence it is not necessary to rebait the trap after making each catch.

The inclined plate forming the approach is preferably mounted on the receptacle by means of short arms I′, made of wire or similar material, said arms protruding into the receptacle at the top beneath the upwardly tilting half or portion of the plate D. These arms I′ may be used as a convenient means for supporting a semicircular stop, or plate, L, which being arranged beneath the plate D is adapted to prevent the entrapped animal from jumping upwardly and freeing itself by the opening movement of the disk.

This device may be made of any suitable material, such as glass, tin, zinc, or the like, or of different sizes, governed by the nature of the animals to be entrapped, and it is to be understood that the specific structure herein shown and described may be modified in this respect without departing from the spirit of the invention.

Having thus described the invention, what is claimed as new is:—

1. In an animal trap, the combination of a receptacle, a guard mounted thereon, an inclined approach located at one side of the receptacle opposite the guard, a bait holder comprising a single length of wire formed at one end into a bait hook secured to the intermediate portion of said guard and an upward extension projecting over the middle portion of the plate formed into a spring member constituting a stop to engage the plate when it tilts to limit its movement, a plate pivoted between its ends for tilting movement, arms projecting from said inclined approach into the receptacle and supporting same in operative position thereon, and a stop plate supported by said arms beneath the upwardly tilting portion of the plate to prevent an animal from forcing said portion upwardly from within the receptacle.

2. In an animal trap, the combination of a receptacle, a guard mounted thereon, an inclined approach located at one side of the receptacle opposite the guard, a bait holder comprising a single length of wire formed at one end into a bait hook secured to the intermediate portion of said guard and an upward extension projecting over the middle portion of the plate formed into a spring member constituting a stop to engage the plate when it tilts to limit its movement, a plate pivoted between its ends for tilting movement, arms projecting from said inclined approach into the receptacle and supporting same in operative position thereon, and a stop plate removably supported by said arms whereby the inclined approach may be withdrawn from the receptacle from engagement with the said stop plate permitting of ready access to the said receptacle for removal of its contents.

In testimony whereof I affix my signature in presence of two witnesses.

WILLIAM H. COXWELL.

Witnesses:
W. H. WEBSTER,
D. F. QUINLAN.